US010446035B2

(12) United States Patent
Nishimura

(10) Patent No.: US 10,446,035 B2
(45) Date of Patent: Oct. 15, 2019

(54) COLLISION AVOIDANCE DEVICE FOR VEHICLE, COLLISION AVOIDANCE METHOD, AND NON-TRANSITORY STORAGE MEDIUM STORING PROGRAM

(71) Applicant: TOYOTA JIDOSHA KABUSHIKI KAISHA, Toyota-shi, Aichi-ken (JP)

(72) Inventor: Kazuya Nishimura, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/036,800

(22) Filed: Jul. 16, 2018

(65) Prior Publication Data
US 2019/0073905 A1 Mar. 7, 2019

(30) Foreign Application Priority Data
Sep. 5, 2017 (JP) ................... 2017-170588

(51) Int. Cl.
*G08G 1/00* (2006.01)
*G08G 1/16* (2006.01)
*H04W 4/46* (2018.01)

(52) U.S. Cl.
CPC ............. *G08G 1/166* (2013.01); *G08G 1/162* (2013.01); *H04W 4/46* (2018.02)

(58) Field of Classification Search
CPC ........ G08B 1/166; B60Q 9/008; B60W 40/08
USPC ........ 340/902, 903, 905, 435, 463, 467, 665
See application file for complete search history.

(56) References Cited

U.S. PATENT DOCUMENTS

| 5,084,154 | A | 1/1992 | Wakizoe et al. | |
| 5,270,708 | A | 12/1993 | Kamishima | |
| 6,411,204 | B1* | 6/2002 | Bloomfield | B60Q 1/302 340/464 |
| 2012/0025969 | A1* | 2/2012 | Dozza | B60Q 1/44 340/463 |
| 2013/0018549 | A1* | 1/2013 | Kobana | B60K 28/06 701/41 |
| 2017/0024938 | A1* | 1/2017 | Lindsay | G07C 5/02 |
| 2018/0257563 | A1* | 9/2018 | Kodama | G06K 9/00805 |

FOREIGN PATENT DOCUMENTS

| JP | H03075392 A | 3/1991 |
| JP | 2671626 B2 | 10/1997 |
| JP | H10114251 A | 5/1998 |
| JP | 2002260199 A | 9/2002 |
| JP | 2012088964 A | 5/2012 |

* cited by examiner

*Primary Examiner* — Tai T Nguyen
(74) *Attorney, Agent, or Firm* — Hunton Andrews Kurth LLP

(57) ABSTRACT

A collision avoidance device for a vehicle includes a driver action detection device configured to detect an action of a driver of the vehicle and an electronic control unit configured to determine whether to provide a notification to a driver of a following vehicle based on the action of the driver of the vehicle, detected by the driver action detection device. The notification is a notification about a sign of a behavior of the vehicle, which possibly causes a rear-end collision of the following vehicle. The electronic control unit is configured to provide the notification to the driver of the following vehicle based on a result determined by the electronic control unit.

12 Claims, 8 Drawing Sheets

FIG. 5

| | | LINK ID | | | | | | STANDARD DEVIATION |
|---|---|---|---|---|---|---|---|---|
| | ... | 0035906349 | 0456732962 | 0033815278 | 1786534281 | 0456732962 | ... | |
| OVERALL AVERAGE VEHICLE SPEED | ... | 34 | 27 | 42 | 43 | 38 | ... | — |
| INDIVIDUAL AVERAGE VEHICLE SPEED | ... | ... | ... | ... | ... | ... | ... | ... |
| 0824352151425 | ... | 36(+2) | 25(−2) | 44(+2) | 46(+3) | 42(+4) | ... | 2.04 |
| ... | ... | ... | ... | ... | ... | ... | ... | ... |

FIG. 7

| SCORE TO BE ASSIGNED | FACE TURN ANGLE OR LINE OF SIGHT MOVING ANGLE | NUMBER OF FACE TURNS OR NUMBER OF MOVEMENTS OF LINE OF SIGHT | EXTENT OF LOW SPEED | NUMBER OF REAR-END ACCIDENTS | DECELERATION FACTOR |
|---|---|---|---|---|---|
| +2 | ≥30° | ≥4 | ≥2σ | ≥10 | YES |
| +1 | 10°- 30° | ≥2 | 1σ - 2σ | 5 - 9 | - |
| 0 | 0° - 10° | 0 - 1 | 0 - 1σ | 0 - 4 | NO |

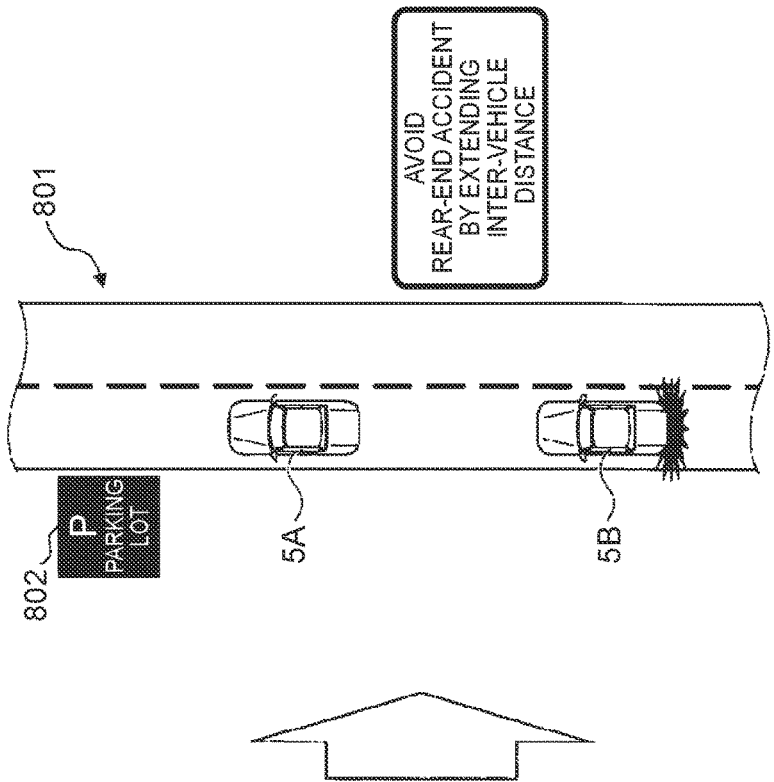
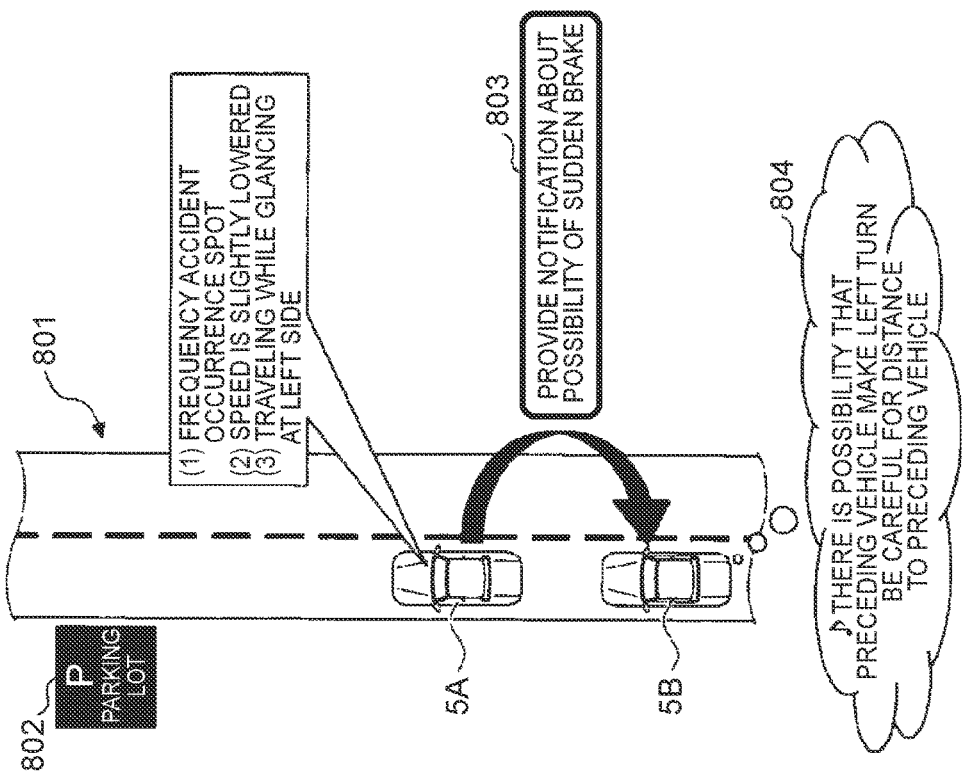

COLLISION AVOIDANCE DEVICE FOR VEHICLE, COLLISION AVOIDANCE METHOD, AND NON-TRANSITORY STORAGE MEDIUM STORING PROGRAM

INCORPORATION BY REFERENCE

The disclosure of Japanese Patent Application No. 2017-170588 filed on Sep. 5, 2017 including the specification, drawings and abstract is incorporated herein by reference in its entirety.

BACKGROUND

1. Technical Field

The disclosure relates to a collision avoidance device for a vehicle, a collision avoidance method, and a non-transitory storage medium storing a program.

2. Description of Related Art

There is known a technique for, for example, when a host vehicle stops at a traffic intersection or travels in a nearly stopped state due to a red signal, a right or left turn, or the like, evaluating the possibility of a rear-end collision of a following vehicle with the host vehicle and issuing a warning, or the like, to the host vehicle or the following vehicle (see, for example, Japanese Unexamined Patent Application Publication No. 10-114251 (JP 10-114251 A), and other publications).

SUMMARY

However, in JP 10-114251 A, and other publications, a sign of a rear-end collision is found only when a deceleration of the host vehicle is estimated in advance as in, for example, the case where a red signal has been detected from infrastructure information or the case where a right or left turn of the host vehicle has been detected from a turn signal. For this reason, for example, in a situation in which a driver of a host vehicle is looking for the entrance of an associated parking lot around a large facility, when the driver reacts to suddenly decelerate the host vehicle at the sight of the entrance, a sign of a rear-end collision of a following vehicle with the host vehicle can be not found.

The disclosure provides information about a sign of a sudden deceleration of a vehicle to a driver of a following vehicle even in a situation in which a deceleration of the vehicle is not estimated in advance.

A first aspect of the disclosure provides a collision avoidance device for a vehicle. The collision avoidance device includes a driver action detection device configured to detect an action of a driver of the vehicle and an electronic control unit configured to determine whether to provide a notification to a driver of a following vehicle based on the action of the driver of the vehicle, detected by the driver action detection device. The notification is a notification about a sign of a behavior of the vehicle, which possibly causes a rear-end collision of the following vehicle. The electronic control unit is configured to provide the notification to the driver of the following vehicle based on a result determined by the electronic control unit.

With the above configuration, the collision avoidance device detects an action of the driver. For example, when a face or line of sight of the driver of the vehicle seems to be looking for something, the collision avoidance device is able to find a sign of a behavior of the vehicle, which possibly causes a rear-end collision of a following vehicle, such as sudden braking in the case where the driver has found a place that the driver is looking for thereafter. For this reason, even in a situation in which a deceleration of the vehicle is not estimated in advance, the collision avoidance device is able to determine whether to provide a notification about the behavior of the vehicle, which possibly causes a rear-end collision of a following vehicle, to a driver of the following vehicle based on the action of the driver of the vehicle. Therefore, even in a situation in which a deceleration of the vehicle is not estimated in advance, the collision avoidance device is able to provide a notification about a sign of the behavior of the vehicle, which possibly causes a rear-end collision, to the driver of the following vehicle based on the determined result.

In the collision avoidance device, the electronic control unit may be configured to determine whether to provide the notification to the driver of the following vehicle based on whether there is a deceleration factor of the vehicle around the vehicle.

With the above configuration, when there is an object (for example, a stop line, a preceding vehicle, or the like) or a situation (for example, a red signal, or the like) that can be a deceleration factor around the vehicle, the collision avoidance device is able to determine that sudden braking of the vehicle easily occurs. Therefore, the collision avoidance device is able to find a sign of the behavior of the vehicle, which possibly causes a rear-end collision, based on whether there is a deceleration factor. That is, specifically, the collision avoidance device is able to determine whether to provide a notification about the sign to the driver of the following vehicle based on whether there is a deceleration factor.

In the collision avoidance device, the electronic control unit may be configured to determine whether to provide the notification to the driver of the following vehicle based on a frequency of occurrence of a rear-end accident near a current location of the vehicle.

With the above configuration, the collision avoidance device is allowed to determine that the behavior of the vehicle, which possibly causes a rear-end collision of a following vehicle, more easily occurs as the frequency of occurrence of a rear-end accident near the current location of the vehicle increases. For this reason, the collision avoidance device is able to find a sign of the behavior of the vehicle, which possibly causes a rear-end collision, in consideration of the frequency of occurrence of a rear-end accident near the current location of the vehicle. That is, specifically, the collision avoidance device is able to determine whether to provide a notification about a sign of the behavior of the vehicle, which possibly causes a rear-end collision of a following vehicle, to a driver of the following vehicle based on the frequency of occurrence of a rear-end accident near the current location of the vehicle.

In the collision avoidance device, the electronic control unit may be configured to determine whether to provide the notification to the driver of the following vehicle based on an extent to which the vehicle is traveling at a speed lower than a predetermined reference speed.

With the above configuration, the collision avoidance device is allowed to determine that there is a higher possibility that the driver is, for example, looking for a facility that is a destination or looking for the entrance of a parking lot of a large facility as the extent to which the vehicle is traveling at a speed lower than a speed during normal times, and determine that sudden braking of the vehicle easily occurs as a target that the driver is looking for is found. Therefore, for example, when the predetermined reference speed corresponding to the speed during normal times is defined, the collision avoidance device is able to find a sign of a behavior of the vehicle, which possibly causes a rear-end collision of a following vehicle, based on an extent to which the vehicle is traveling at a speed lower than the speed during normal times. That is, specifically, the collision avoidance device is able to determine whether to provide a notification about a sign of the behavior of the vehicle, which possibly causes a rear-end collision of a following vehicle, to a driver of the following vehicle based on the extent to which the vehicle is traveling at a speed lower than the speed during normal times increases.

In the collision avoidance device, the electronic control unit may be configured to determine whether to provide the notification to the driver of the following vehicle based on whether a first predetermined direction detected by the driver action detection device and a second predetermined direction coincide with each other. The first predetermined direction may be any one of a direction of a face of the driver and a direction of a line of sight of the driver. The second predetermined direction may be any one of a direction in which a route set by a navigation system of the vehicle branches off at a nearest intersection ahead of the vehicle and a direction in which a facility is present when viewed from the vehicle that has reached around a destination. The destination may be set by the navigation system. The facility may correspond to the destination.

With the above configuration, when the direction of the face or line of sight of the driver and the direction in which the guidance route set by the in-vehicle navigation system branches off at the intersection ahead of the vehicle coincide with each other, the collision avoidance device is allowed to determine that the vehicle can branch off at the next intersection in accordance with the set guidance route, that is, the vehicle possibly suddenly decelerates at the time of branching. In addition, when the direction of the face or line of sight of the driver and the direction in which a facility that is a destination is present when viewed from the vehicle that has reached the destination set by the in-vehicle navigation system coincide with each other, the collision avoidance device is allowed to determine that the driver of the vehicle is driving the vehicle while looking for the entrance, or the like, of the facility, that is, the vehicle possibly suddenly decelerates as the driver finds the entrance, or the like. Therefore, specifically, the collision avoidance device is able to determine whether to provide a notification about a sign of the behavior of the vehicle, which possibly causes a rear-end collision, to a following vehicle.

In the collision avoidance device, the electronic control unit may be configured to assign a score in accordance with each of the following i) to v), i) a frequency of movement of a detected object, the frequency of movement is detected by the driver action detection device, ii) an amount of movement of the detected object, the amount of movement is detected by the driver action detection device, iii) whether there is a deceleration factor of the vehicle around the vehicle, iv) a frequency of occurrence of a rear-end accident near a current location of the vehicle, and v) an extent to which the vehicle is traveling at a speed lower than a predetermined reference speed. The electronic control unit may be configured to determine whether to provide the notification to the driver of the following vehicle based on a sum of the scores. The detected object may be any one of the face of the driver and the line of sight of the driver.

With the above configuration, the collision avoidance device is allowed to determine that there is a higher possibility that the driver of the vehicle is looking for an intersection for causing the vehicle to branch off, a destination, or the like, as the frequency or amount of movement of the face or line of sight of the driver of the vehicle increases, and, when a target that the driver is looking for has been found, sudden braking of the vehicle, that is, the behavior of the vehicle, which possibly causes a rear-end collision, easily occurs. When there is an object or situation that can be a deceleration factor around the vehicle, the collision avoidance device is also allowed to determine that sudden braking of the vehicle, that is, the behavior of the vehicle, which possibly causes a rear-end collision, easily occurs. In addition, the collision avoidance device is allowed to determine that the behavior of the vehicle, which possibly causes a rear-end collision, more easily occurs as the frequency of occurrence of a rear-end accident near the current location of the vehicle increases. Furthermore, the collision avoidance device is also allowed to determine that there is a higher possibility that the driver is, for example, looking for a facility that is a destination or looking for the entrance of a parking lot of a large facility as the extent to which the vehicle is traveling at a speed lower than a speed during normal times, which can be defined as a predetermined reference speed, increases, and, when a target that the driver is looking for has been found, determine that sudden braking of the vehicle, that is, the behavior of the vehicle, which possibly causes a rear-end collision, easily occurs. Therefore, the collision avoidance device assigns a score to each item such that it is determined that the behavior of the vehicle, which possibly causes a rear-end collision, more easily occurs as the score increases. The collision avoidance device is able to determine whether to provide a notification about a sign of the behavior of the vehicle, which possibly causes a rear-end collision of a following vehicle, to a driver of the following vehicle based on whether the sum of the assigned scores is larger than or equal to a predetermined threshold.

In the collision avoidance device, the predetermined reference speed may be defined in advance based on a standard deviation of a difference between a reference vehicle speed and a vehicle speed of the vehicle for each of a plurality of roads through which the vehicle has passed.

With the above configuration, specifically, the collision avoidance device is allowed to utilize a standard deviation of a difference between a reference vehicle speed (for example, a legal vehicle speed or an average vehicle speed of a plurality of passage vehicles) and a vehicle speed of the vehicle for each road as a reference corresponding to a speed during normal times for defining the extent to which the vehicle is traveling at a speed lower than the speed during normal times.

The collision avoidance device may further include a following vehicle detection device configured to detect the following vehicle. The electronic control unit may be configured to, when the following vehicle has been detected by the following vehicle detection device, determine to provide the notification to the driver of the following vehicle.

With the above configuration, since the collision avoidance device provides a notification to a driver of a following vehicle only when there is a following vehicle, the collision avoidance device is able to reduce an unnecessary notification.

In the collision avoidance device, the driver action detection device may include at least one of a camera provided in a cabin of the vehicle and a line-of-sight sensor.

With the above configuration, specifically, the collision avoidance device is able to detect the action of the driver with the use of the camera, the line-of-sight sensor, or the like.

In the collision avoidance device, the electronic control unit may be configured to provide the notification to the driver of the following vehicle by vehicle-to-vehicle communication.

With the above configuration, the collision avoidance device is able to transmit the content of a notification to a following vehicle by vehicle-to-vehicle communication and provide the notification to a driver of the following vehicle via a notification unit that is mounted on the following vehicle, for example, an audio output device, such as a speaker, or a display device, such as a display.

In the collision avoidance device, the electronic control unit may be configured to provide the notification to the driver of the following vehicle with the use of a lamp device provided at a rear of the vehicle. The lamp device may include at least one of a hazard flasher and a turn signal lamp.

With the above configuration, specifically, the collision avoidance device is able to provide a notification about a sign of the behavior of the vehicle, which possibly causes a rear-end collision, to a driver of a following vehicle by, for example, blinking the hazard flasher or blinking the turn signal lamp at a side to which the vehicle is predicted to branch off.

In the collision avoidance device, the notification may have a content that the vehicle possibly suddenly decelerates.

With the above configuration, specifically, the collision avoidance device is able to provide a notification that the vehicle possibly suddenly decelerates, to a driver of a following vehicle.

A second aspect of the disclosure provides a collision avoidance method that is executed by a collision avoidance device. The collision avoidance device includes a driver action detection device and an electronic control unit. The collision avoidance method includes: a driver action detection step of detecting, by the driver action detection device, an action of a driver of a vehicle; a determination step of determining, by the electronic control unit, whether to provide a notification about a sign of a behavior of the vehicle, which possibly causes a rear-end collision of a following vehicle, to a driver of the following vehicle based on the action of the driver of the vehicle, detected in the driver action detection step; and a notification step of providing, by the electronic control unit, the notification to the driver of the following vehicle based on a result determined in the determination step.

With the above configuration, even in a situation in which a deceleration of the vehicle is not estimated in advance, it is possible to provide a notification about a sign of the behavior of the vehicle, which possibly causes a rear-end collision, to the driver of the following vehicle based on the determined result.

A third aspect of the disclosure provides a non-transitory storage medium storing a program. The program is executed by a computer mounted on a vehicle to implement a determination step and a notification step. The determination step is a step of determining whether to provide a notification about a sign of a behavior of the vehicle, which possibly causes a rear-end collision of a following vehicle, to a driver of the following vehicle based on the action of the driver of the vehicle, detected by a driver action detection device mounted on the vehicle. The notification step is a step of providing the notification to the driver of the following vehicle based on a result determined in the determination step.

With the above configuration, even in a situation in which a deceleration of the vehicle is not estimated in advance, it is possible to provide a notification about a sign of the behavior of the vehicle, which possibly causes a rear-end collision, to the driver of the following vehicle based on the determined result.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a table that shows an example of the normal traveling state information;

FIG. 7 is a table that shows an example of a score calculation table;

FIG. 8A is a view that illustrates an operation of the collision avoidance device; and FIG. 8B is a view that illustrates an operation of the collision avoidance device.

DETAILED DESCRIPTION OF EMBODIMENTS

Hereinafter, an embodiment of the disclosure will be described with reference to the accompanying drawings.

Figure 2:
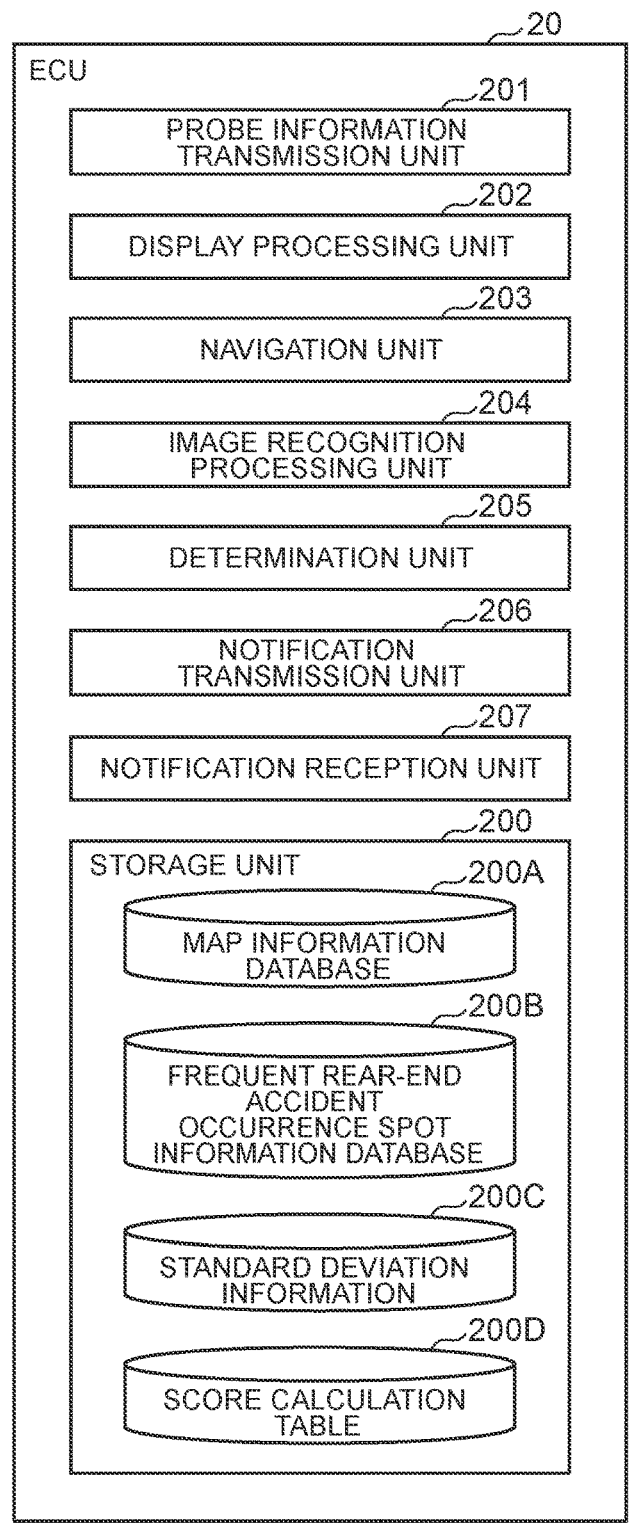
FIG. 2 is a functional block diagram that shows an example of the functional configuration of a collision avoidance device that is mounted on a vehicle.
Figure 3:
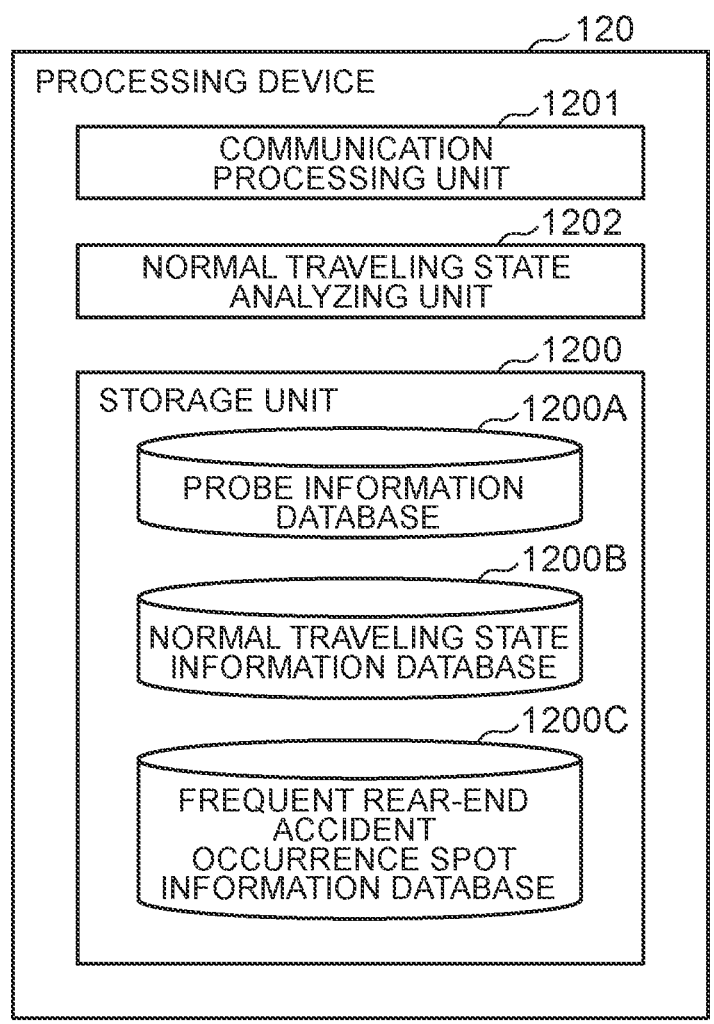
FIG. 3 is a functional block diagram that shows an example of the functional configuration of a center server.

Initially, the configuration of a collision avoidance system 1 according to the present embodiment will be described with reference to FIG. 1 to FIG. 3.

Figure 1:
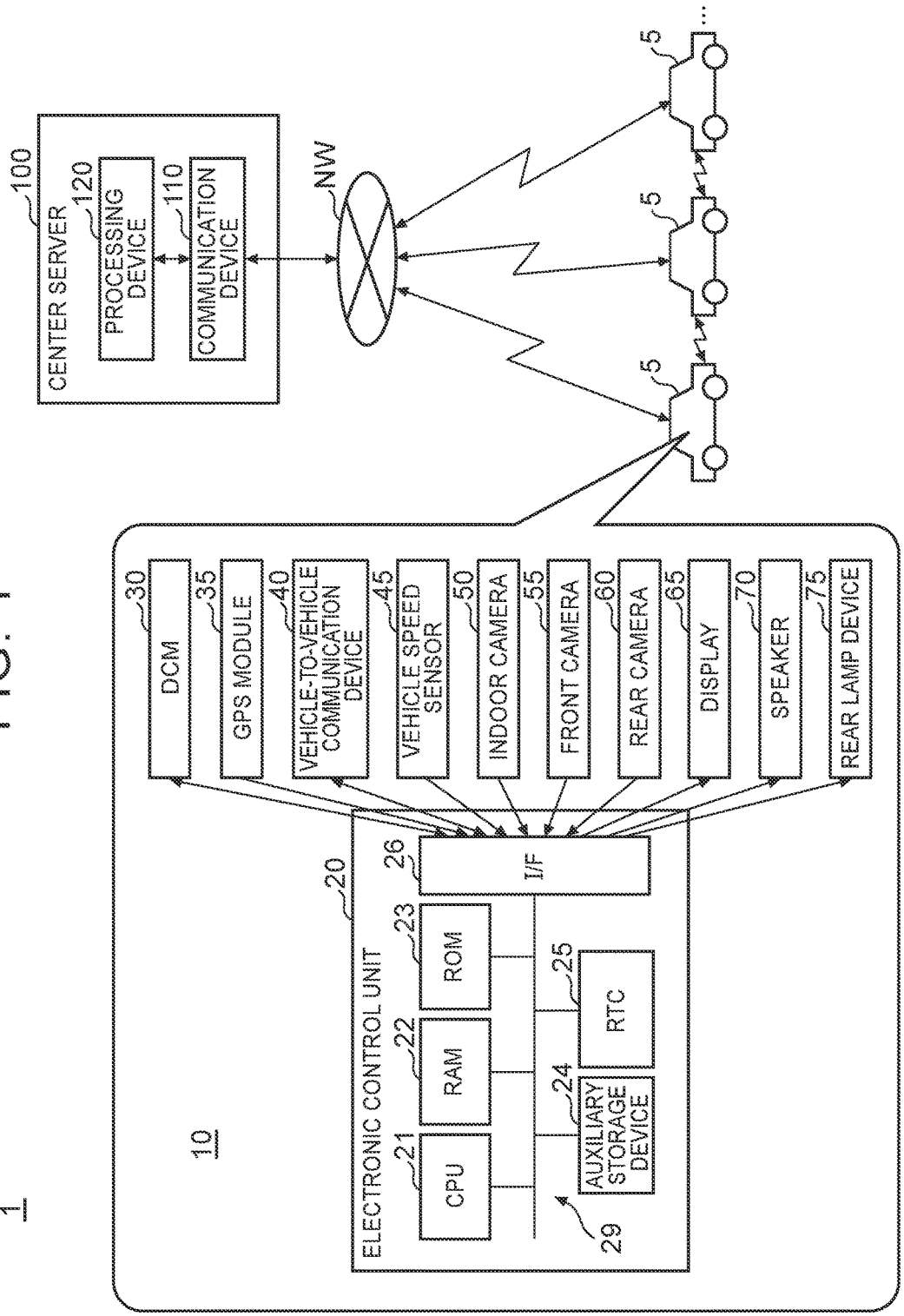
FIG. 1 is a diagram that shows an example of the configuration of a collision avoidance system according to an embodiment.

FIG. 1 is a diagram that schematically shows an example of the configuration of the collision avoidance system 1 according to the present embodiment. FIG. 2 is a functional block diagram that shows an example of the functional configuration of a collision avoidance device 10 that is mounted on each vehicle 5 according to the present embodiment. FIG. 3 is a functional block diagram that shows an example of the configuration of a center server 100 according to the present embodiment.

The collision avoidance system 1 includes the plurality of vehicles 5 and the center server 100. The vehicles 5 are able to carry out vehicle-to-vehicle communication with each other. The center server 100 is communicably connected to each of the vehicles 5 through a predetermined communication network NW.

One of the vehicles 5 has the same configuration of the collision avoidance system 1 as another one of the vehicles 5. For this reason, FIG. 1 representatively shows only detailed components that are mounted on the one of the vehicles 5.

The collision avoidance device 10 is mounted on each vehicle 5.

The collision avoidance device 10 includes an electronic control unit (ECU) 20, a data communication module (DCM) 30, a global positioning system (GPS) module 35, a vehicle-to-vehicle communication device 40, a vehicle speed sensor 45, an indoor camera 50, a front camera 55, a rear camera 60, a display 65, a speaker 70, and a rear lamp device 75.

The ECU 20 is an electronic control unit that executes a control process related to a predetermined function in the vehicle 5. For example, the ECU 20 acquires vehicle information from various sensors, actuators, various ECUs, and the like. The vehicle information includes information about the status of the vehicle 5 (vehicle status), information about the status of an occupant (occupant status) of the vehicle 5, and information about the status of surroundings (surrounding status) of the vehicle 5. The ECU 20 uploads the acquired vehicle information to the center server 100 via the DCM 30. For example, the ECU 20 executes a control process related to a navigation function of providing a route guidance to a destination in response to a request from a user, or the like. For example, as will be described later, the ECU 20 executes a control process related to a collision avoidance function including a function of avoiding a collision of a following vehicle with the host vehicle 5 due to a behavior (specifically, a sudden deceleration) of the host vehicle 5.

The functions of the ECU 20 may be implemented by hardware, software or a combination of hardware and software. For example, the ECU 20 is mainly formed of a microcomputer including a central processing unit (CPU) 21, a random access memory (RAM) 22, a read only memory (ROM) 23, an auxiliary storage device 24, a real time clock (RTC) 25, and a communication interface (I/F) 26 that are connected to one another via a bus 29. The ECU 20 includes a probe information transmission unit 201, a display processing unit 202, a navigation unit 203, an image recognition processing unit 204, a determination unit 205, a notification transmission unit 206 and a notification reception unit 207 as functional units that are implemented by executing one or more programs stored in the ROM 23 or the auxiliary storage device 24. The ECU 20 includes a storage unit 200 as a storage area that is defined in an internal memory of the auxiliary storage device 24, or the like. A map information database 200A, a frequent rear-end accident occurrence spot information database 200B, standard deviation information 200C, and a score calculation table 200D are stored in the storage unit 200.

The functions of the ECU 20 may be implemented by a plurality of ECUs in a distributed manner. Specifically, for example, the function of the probe information transmission unit 201 of the ECU 20, the function of the display processing unit 202 of the ECU 20, the function of the navigation unit 203 of the ECU 20, the function of the image recognition processing unit 204 of the ECU 20, and the functions of the determination unit 205, notification transmission unit 206 and notification reception unit 207 of the ECU 20 may be implemented by ECUs different from one another.

The probe information transmission unit 201 periodically acquires vehicle information from the various sensors, actuators, ECUs, and the like, and transmits probe information including the acquired vehicle information to the center server 100 via the DCM 30. For example, the probe information transmission unit 201 acquires positional information of the vehicle 5 from the GPS module 35 as vehicle information. The probe information transmission unit 201 also acquires vehicle speed information of the vehicle 5 from the vehicle speed sensor 45 as vehicle information. For example, the probe information transmission unit 201 also acquires information about an object (for example, a stop line or a preceding vehicle) or situation (for example, a red signal, or the like) that can be a deceleration factor of the vehicle 5 and that is recognized from a captured image of the front camera 55 (deceleration factor information) with the use of the image recognition processing unit 204 (described later). Hereinafter, an object or situation that can be a deceleration factor is simply referred to as "deceleration factor". The deceleration factor information contains whether there is a deceleration factor and the type (for example, a stop line, a preceding vehicle, a red signal, or the like) of a deceleration factor in the case where there is a deceleration factor. For example, the probe information transmission unit 201 also acquires, from the RTC 25, time information at the time when these pieces of vehicle information have been acquired. Then, the probe information transmission unit 201 generates probe information containing the acquired vehicle information, such as the positional information of the vehicle 5, the vehicle speed information and the deceleration factor information around the vehicle 5, and the time information at the time when the vehicle information has been acquired, and transmits the probe information to the center server 100 via the DCM 30.

Probe information may be configured not to contain time information at the time when vehicle information has been acquired. In this case, the center server 100 may determine time of transmission of probe information from the vehicle 5, time of receipt of probe information by the center server 100, estimated time that corresponds to positional information of the vehicle 5 and that is calculated from these time of transmission and time of receipt, or the like, as time information corresponding to an intended one of various pieces of vehicle information.

The display processing unit 202 executes a control process for causing the display 65 to display various information images. For example, the display processing unit 202 causes the display 65 to display a map image with the use of the map information database 200A of the storage unit 200 in response to a request from the navigation unit 203, and causes the display 65 to display guidance information regarding a route guidance to a destination on the map image in a superimposed manner. The display processing unit 202 also causes the display 65 to display a notification that a preceding vehicle (the vehicle 5 located ahead of) the host vehicle 5 possibly suddenly decelerates, in response to a request from the notification reception unit 207.

The function of the display processing unit 202 may be incorporated in the display 65.

The navigation unit 203 makes a route search from a current location to a destination based on a known algorithm. The navigation unit 203 outputs one or plurality of routes as route search results, determines a route that is used for a route guidance through user's selection operation, and carries out a route guidance from the current location to the destination based on the selected route. The navigation unit 203, for example, causes the display 65 to display a destination setting screen or display a map image and a route guidance image in a superimposed manner via the display processing unit 202 in synchronization with a route search and a route guidance. The navigation unit 203 may carry out a route search and a route guidance based on a destination that is set through input operation of a user of the vehicle 5 or may carry out a route search and a route guidance based on a destination (estimated destination) that is automatically set based on a past travel history, or the like, of the vehicle 5.

The image recognition processing unit 204 executes image recognition process on captured images of the indoor camera 50, front camera 55 and rear camera 60 by applying a known technique related to artificial intelligence (AI), particularly, machine learning, such as deep learning, and extracts a predetermined object.

For example, the image recognition processing unit 204 executes a process of extracting a predetermined action of an occupant including a driver of the vehicle 5 from a captured image of the indoor camera 50 (hereinafter, referred to as "driver action recognition process"). The predetermined action is, for example, an action of horizontal movement of a line of sight (hereinafter, referred to as "line-of-sight moving action") or an action of changing the orientation of a face (hereinafter, referred to as "head-turn action"). For example, the image recognition processing unit 204 also executes a process of extracting a deceleration factor around the host vehicle 5 from a captured image of the front camera 55 (hereinafter, referred to as "deceleration factor recognition process"). For example, the image recognition processing unit 204 also executes a process of extracting a vehicle behind the host vehicle 5 from a captured image of the rear camera 60 (hereinafter, referred to as "following vehicle recognition process").

A deceleration factor around the vehicle 5 may be acquired from something other than a captured image of the front camera 55. For example, information about a stop line may be acquired from, for example, road information that can be contained in the map information database 200A that is consulted by the navigation unit 203. For example, information about a red signal may be acquired from, for example, a road-side device (a traffic signal, or the like) by road-to-vehicle communication using the vehicle-to-vehicle communication device 40 or may be acquired from, for example, signal information, or the like, that is distributed from a road traffic information center, or the like, to each vehicle 5. For example, a vehicle ahead of the vehicle 5 may be detected by another distance sensor, such as millimeter wave radar and light detection and ranging (LIDAR).

The determination unit 205 determines whether to provide a notification about a sign of the behavior of the host vehicle 5, which possibly causes a rear-end collision of a following vehicle, specifically, a notification that there is a possibility of sudden deceleration (hereinafter, referred to as "sudden deceleration sign notification"), to the following vehicle behind the host vehicle 5. For example, the determination unit 205 determines whether to provide a sudden deceleration sign notification to a driver of a following vehicle based on a driver's action detected by the indoor camera 50 and extracted by the image recognition processing unit 204. For example, the determination unit 205 also determines whether to provide a sudden deceleration sign notification to a driver of a following vehicle based on whether there is a deceleration factor of the vehicle 5, detected by the front camera 55 and extracted by the image recognition processing unit 204. For example, the determination unit 205 also determines whether to provide a sudden deceleration sign notification to a driver of a following vehicle based on whether there is a following vehicle detected by the rear camera 60 and extracted by the image recognition processing unit 204. For example, the determination unit 205 also determines whether to provide a sudden deceleration sign notification to a driver of a following vehicle based on the frequency of occurrence of a rear-end accident in the past near the current location of the vehicle 5. Details will be described later (see FIG. 5).

When the determination unit 205 determines to provide a notification about the behavior of the host vehicle 5, which possibly causes a rear-end collision of a following vehicle, the notification transmission unit 206 (an example of a notification unit) transmits a sudden deceleration sign notification to the following vehicle, that is, another vehicle that travels behind the host vehicle 5, via the vehicle-to-vehicle communication device 40. Thus, as will be described later, a notification about the possibility of sudden deceleration is provided to a driver of another vehicle 5 that travels behind the host vehicle 5 through the display 65 or speaker 70 of the another vehicle 5. That is, the notification transmission unit 206 is able to provide a notification about the possibility of sudden deceleration of the host vehicle 5 to a driver of a following vehicle by vehicle-to-vehicle communication.

The notification transmission unit 206 may transmit a sudden deceleration sign notification to another vehicle 5 that travels behind via the center server 100. In this case, as the center server 100 receives a sudden deceleration sign notification from the vehicle 5, the center server 100 transfers the sudden deceleration sign notification to another vehicle 5 that is a destination vehicle. Thus, the notification reception unit 207 of the another vehicle 5 receives the sudden deceleration sign notification from the center server 100 with the use of the DCM 30.

When the vehicle-to-vehicle communication device 40 has received a sudden deceleration sign notification from another vehicle 5 that travels ahead, the notification reception unit 207 causes the display 65 to display a notification that the another vehicle 5 that travels ahead possibly suddenly decelerates via the display processing unit 202 or output the notification from the speaker 70 in form of voice. Thus, when there is a possibility of sudden deceleration of a preceding vehicle, the driver of the host vehicle 5 is able to avoid a collision with the preceding vehicle 5 that travels ahead by, for example, decelerating the host vehicle 5 in advance.

The DCM 30 is, for example, a communication device that carries out bidirectional communication with the center server 100 through a mobile telephone network including a large number of base stations as terminals or a predetermined communication network NW including the Internet, or the like. The DCM 30 is connected to various ECUs including the ECU 20 through an in-vehicle network, such as a controller area network (CAN), so as to be communicable with each other.

The GPS module 35 receives GPS signals that are transmitted from three or more, desirably, four or more satellites above the vehicle 5, and measures the position of the host vehicle 5. The GPS module 35 is communicably connected to the ECU 20, and the like, through one-to-one communication lines or an in-vehicle network, such as a CAN. The measured positional information of the vehicle 5 is input to the ECU 20, and the like.

The vehicle-to-vehicle communication device 40 is a known communication device that carries out wireless communication between the vehicles 5 by utilizing waves of a radio frequency (RF) band, such as 760 MHz band and 5.9 GHz band. The vehicle-to-vehicle communication device 40 is connected to various ECUs including the ECU 20 via an in-vehicle network, such as a CAN, so as to be communicable with each other.

The vehicle speed sensor 45 is a known detector that detects a vehicle speed of the vehicle 5. The vehicle speed sensor 45 is communicably connected to the ECU 20, and the like, through one-to-one communication lines or an in-vehicle network, such as a CAN. A detected signal corresponding to a vehicle speed of the vehicle 5 (vehicle speed information) is input to the ECU 20, and the like.

The indoor camera 50 (an example of a driver action detection unit) captures a predetermined capture range of an indoor area, including the face and upper body of a driver. Thus, the indoor camera 50 is able to detect the action of the driver, for example, the action of the face, line of sight, or the like, of the driver, and output a captured image including the detected action. The indoor camera 50 is attached to, for example, a front header portion of an upper front area of a driver seat inside the cabin of the vehicle 5. The indoor camera 50 starts up as a result of, for example, turning on the ignition (IG-ON) of the vehicle 5, and, after the startup, captures the predetermined capture range of the indoor area of the vehicle 5 at predetermined intervals, for example, at intervals of 1/30 seconds, until the ignition of the vehicle 5 is turned off (IG-OFF).

Instead of or in addition to the indoor camera 50, another sensor, for example, a line-of-sight sensor, or the like, may be mounted on the vehicle 5.

The front camera 55 captures a predetermined capture range ahead of the vehicle 5. Thus, the front camera 55 is able to detect a deceleration factor, such as a preceding vehicle, a stop line and a red light traffic signal ahead of the vehicle 5, and output a captured image including the deceleration factor. The front camera 55 is attached to, for example, a center upper end on the indoor side of a front windshield of the vehicle 5, that is, a transversely center portion of a front header on the indoor side of the vehicle 5. The front camera 55, as well as the indoor camera 50, for example, starts up as a result of IG-ON of the vehicle 5, and, after the startup, captures a predetermined capture range ahead of the vehicle 5 at predetermined intervals, for example, intervals of 1/30 seconds, until IG-OFF of the vehicle 5.

The rear camera 60 (an example of a following vehicle detection unit) captures a predetermined range behind the vehicle 5. Thus, the rear camera 60 is able to detect a vehicle behind the host vehicle 5, and output a captured image including the detected following vehicle. The rear camera 60 is attached to, for example, a center upper end on the indoor side of a rear window of the vehicle 5, that is, a transversely center portion of a rear header on the indoor side of the vehicle 5. The rear camera 60, as well as the indoor camera 50, for example, starts up as a result of IG-ON of the vehicle 5 and, after the startup, captures a predetermined capture range behind the vehicle 5 at predetermined intervals, for example, intervals of 1/30 seconds, until IG-OFF of the vehicle 5.

Each of the indoor camera 50, the front camera 55, and the rear camera 60 is communicably connected to the ECU 20, and the like, through one-to-one communication lines or an in-vehicle network, such as a CAN. A corresponding one of captured images is input to the ECU 20, and the like.

The display 65 displays various information images under control of the ECU 20 (specifically, the display processing unit 202). The display 65 is, for example, a liquid crystal display, an organic electroluminescence display, or the like, and may be of a touch panel type and also used as an operating unit. The display 65 is provided in a visually recognizable area for a user, particularly, a driver, inside the cabin of the vehicle 5, for example, an upper area around a center in the transverse direction of an instrument panel.

The speaker 70 is a known audio output device that outputs voice. The speaker 70 is, for example, incorporated in the instrument panel or door trims inside the cabin of the vehicle 5 in such a manner that main audio output portions are exposed.

The rear lamp device 75 is a lamp device that is mounted at the rear of the vehicle 5 and that is visually recognizable from a driver of a following vehicle. The rear lamp device 75 includes, for example, hazard flashers and turn signal lamps at the rear of the vehicle 5. The rear lamp device 75 is communicably connected to the ECU 20, and the like, through one-to-one communication lines or an in-vehicle network, such as a CAN.

The center server 100 collects probe information from the vehicles 5. The center server 100 includes a communication device 110 and a processing device 120.

The functions of the center server 100 may be implemented by a plurality of servers in a distributed manner.

The communication device 110 carries out bidirectional communication with each of the vehicles 5 through the communication network NW under control of the processing device 120 (specifically, a communication processing unit 1201).

The processing device 120 executes various control processes in the center server 100. The functions of the processing device 120 may be implemented by hardware, software or a combination of hardware and software. The processing device 120 is mainly formed of, for example, one or plurality of server computers each including a CPU, a RAM, a ROM, an auxiliary storage device, an RTC, a communication interface, and the like. The processing device 120 includes, for example, the communication processing unit 1201 and a normal traveling state analyzing unit 1202 as functional units that are implemented by executing one or more programs saved in the ROM or the auxiliary storage device on the CPU. The processing device 120 also includes, for example, a storage unit 1200 as a storage area that is defined in the auxiliary storage device of the server computer(s) or an external storage device, or the like, connected to the server computer(s). The storage unit 1200 contains a probe information database 1200A, a normal traveling state information database 1200B and a frequent rear-end accident occurrence spot information database 1200C.

The communication processing unit 1201 controls the communication device 110, and exchanges various signals, such as control signals and information signals, with each of the vehicles 5. For example, the communication processing unit 1201 (an example of a vehicle information acquisition unit and an example of a travel history information acquisition unit) receives probe information including vehicle information from each of the vehicles 5. The probe information received by the communication processing unit 1201 is stored in the probe information database 1200A in association with an identifier (ID) unique to the source vehicle 5. Hereinafter, an ID unique to the vehicle 5 is referred to as "vehicle ID".

The normal traveling state analyzing unit 1202 analyzes a traveling state (specifically, vehicle speed) of each of the vehicles 5 during normal times (specifically, when there is no deceleration factor) based on probe information, and outputs information about the traveling state during normal times (normal traveling state information). The normal traveling state analyzing unit 1202 saves the output normal traveling state information in the normal traveling state information database 1200B, and updates the content of the normal traveling state information database 1200B. The details of the process that is executed by the normal traveling state analyzing unit 1202 will be described later (see FIG. 4).

Next, the details of the operation of the collision avoidance system 1 will be described with reference to FIG. 4 to FIG. 7.

Figure 4:
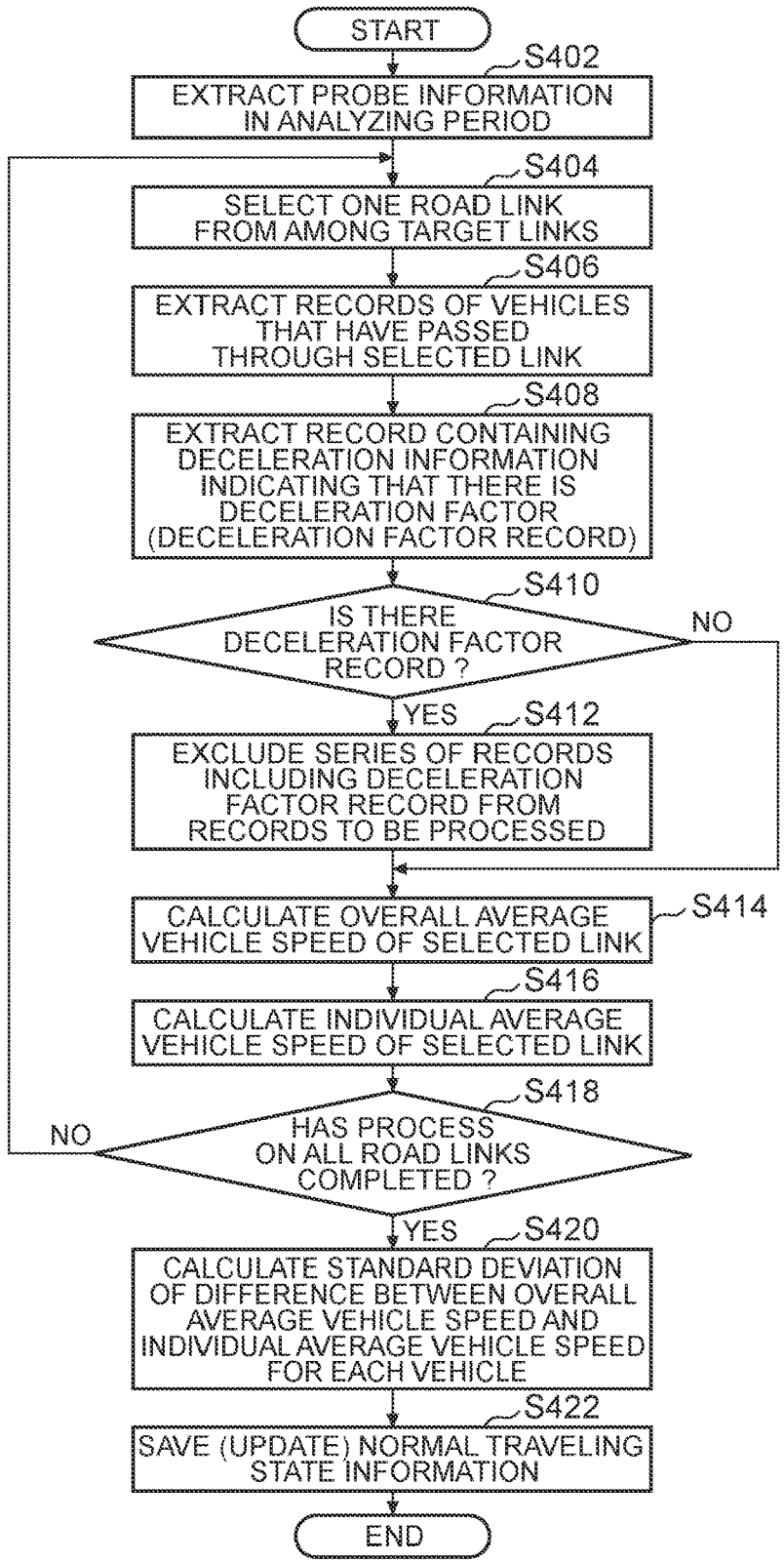
FIG. 4 is a flowchart that schematically shows an example of a process of outputting normal traveling state information by the center server (normal traveling state information outputting process)

Initially, FIG. 4 is a flowchart that schematically shows an example of a process in which the center server 100 outputs normal traveling state information (normal traveling state information output process). The process according to this flowchart is executed periodically, for example, at prescribed timing every day.

In step S402, the normal traveling state analyzing unit 1202 extracts probe information within a predetermined analyzing period (hereinafter, analyzing target probe information) from the probe information database 1200A. The analyzing period may be a selected period, for example, three months or one year from a current time point, a previous day, or the like, all the period from the start of acquisition of probe information, or the like.

In step S404, the normal traveling state analyzing unit 1202 selects one road link from among road links to be processed by the flowchart (hereinafter, referred to as target links).

The target links may be all the road links present in an area intended by the collision avoidance system 1 (for example, a prescribed area in Japan, or the like), or may be part of road links, which conform to a predetermined criterion (for example, a criterion regarding a road type, such as a national road and a prefectural road, a criterion regarding a road size, such as a road width, or the like) among the road links.

In step S406, the normal traveling state analyzing unit 1202 extracts pieces of probe information at the time when the vehicle 5 has passed through the selected road link (hereinafter, referred to as selected link) from the probe information to be analyzed as records to be processed.

In step S408, the normal traveling state analyzing unit 1202 extracts a record including deceleration factor information (hereinafter, referred to as deceleration factor record) that indicates that there is a deceleration factor of the vehicle 5 from the records extracted in step S406.

In step S410, the normal traveling state analyzing unit 1202 determines whether a deceleration factor record has been extracted. When a deceleration factor record has been extracted, the normal traveling state analyzing unit 1202 proceeds to step S412. When no deceleration factor record has been extracted, the normal traveling state analyzing unit 1202 proceeds to step S414.

In step S412, the normal traveling state analyzing unit 1202 excludes a series of records related to the deceleration factor record, that is, records around time corresponding to the deceleration factor record of the vehicle 5 from the records to be processed.

In step S414, the normal traveling state analyzing unit 1202 calculates an average vehicle speed at the time of passage for the total number of vehicles 5 that have passed through the selected link (hereinafter, referred to as "overall average vehicle speed") based on vehicle speed information contained in the records to be processed. For example, the normal traveling state analyzing unit 1202 calculates an average vehicle speed at the time of passage of a vehicle 5 from vehicle speed information contained in a series of records at the time when the vehicle 5 has passed through the selected link in a time period. Then, the normal traveling state analyzing unit 1202 calculates an overall average vehicle speed based on the calculated average vehicle speed of a selected vehicle 5 of each time. At this time, the overall average vehicle speed may be a simple average obtained by dividing the sum of the average vehicle speeds of selected vehicles 5 of respective times by the total number of the selected vehicles 5 or may be, for example, such a weighted average that the importance of an average vehicle speed of a selected vehicle 5 of each time corresponding to a new record increases.

In step S416, the normal traveling state analyzing unit 1202 calculates an average vehicle speed at the time when each vehicle 5 passes through the selected link (hereinafter, referred to as "individual average vehicle speed") based on vehicle speed information contained in the records to be processed. For example, the normal traveling state analyzing unit 1202 extracts records corresponding to a specified one of the vehicles 5 from the records to be processed, and calculates an average vehicle speed of each time when the specified one of the vehicles 5 has passed through the selected link based on the extracted records. The normal traveling state analyzing unit 1202 calculates an individual average vehicle speed for the selected link based on the calculated average vehicle speed of each time. At this time, the individual average vehicle speed may be a simple average obtained by dividing the sum of average vehicle speeds of respective times by the number of passages or may be, for example, such a weighted average that the importance of an average vehicle speed of each time corresponding to a new record increases.

In step S418, the normal traveling state analyzing unit 1202 determines whether the process has completed on all the target links. When the process has completed on all the target links, the normal traveling state analyzing unit 1202 proceeds to step S420. When the process has not completed on all the target links, the normal traveling state analyzing unit 1202 returns to step S404, changes the selected link, and then repeats the processes of step S406 to step S418.

In step S420, the normal traveling state analyzing unit 1202 calculates a standard deviation of a difference between the overall average vehicle speed and the individual average vehicle speed for each vehicle 5 over all the target links based on the overall average vehicle speeds of all the target links, calculated in step S414, and the individual average vehicle speeds of all the target links, calculated in step S416. Hereinafter, the standard deviation is simply referred to as "standard deviation of a difference between the overall average vehicle speed and the individual average vehicle speed.

In step S422, the normal traveling state analyzing unit 1202 outputs normal traveling state information containing the overall average vehicle speed of each target link, calculated in step S414, the individual average vehicle speed of each target link, calculated in step S416, and the standard deviation of a difference between the overall average vehicle speed and the individual average vehicle speed for each vehicle 5, calculated in step S420, and saves the normal traveling state information in the normal traveling state information database 1200B, that is, updates the normal traveling state information database 1200B, after which the current process ends.

For example, FIG. 5 is a table that shows an example of the normal traveling state information.

As shown in FIG. 5, in this example, the normal traveling state information is table format data including overall average vehicle speeds by road link ID, individual average vehicle speeds that are shown by vehicle ID of each road link ID, and a standard deviation of a difference between the overall average vehicle speed and the individual average vehicle speed as elements of the columns.

The road link ID is a unique ID that is defined for each road link, and is expressed by 10-digit number sequence in this example. A numeric in the parenthesis of each individual average vehicle speed of each road link ID indicates a difference from a corresponding overall average vehicle speed.

Figure 6:
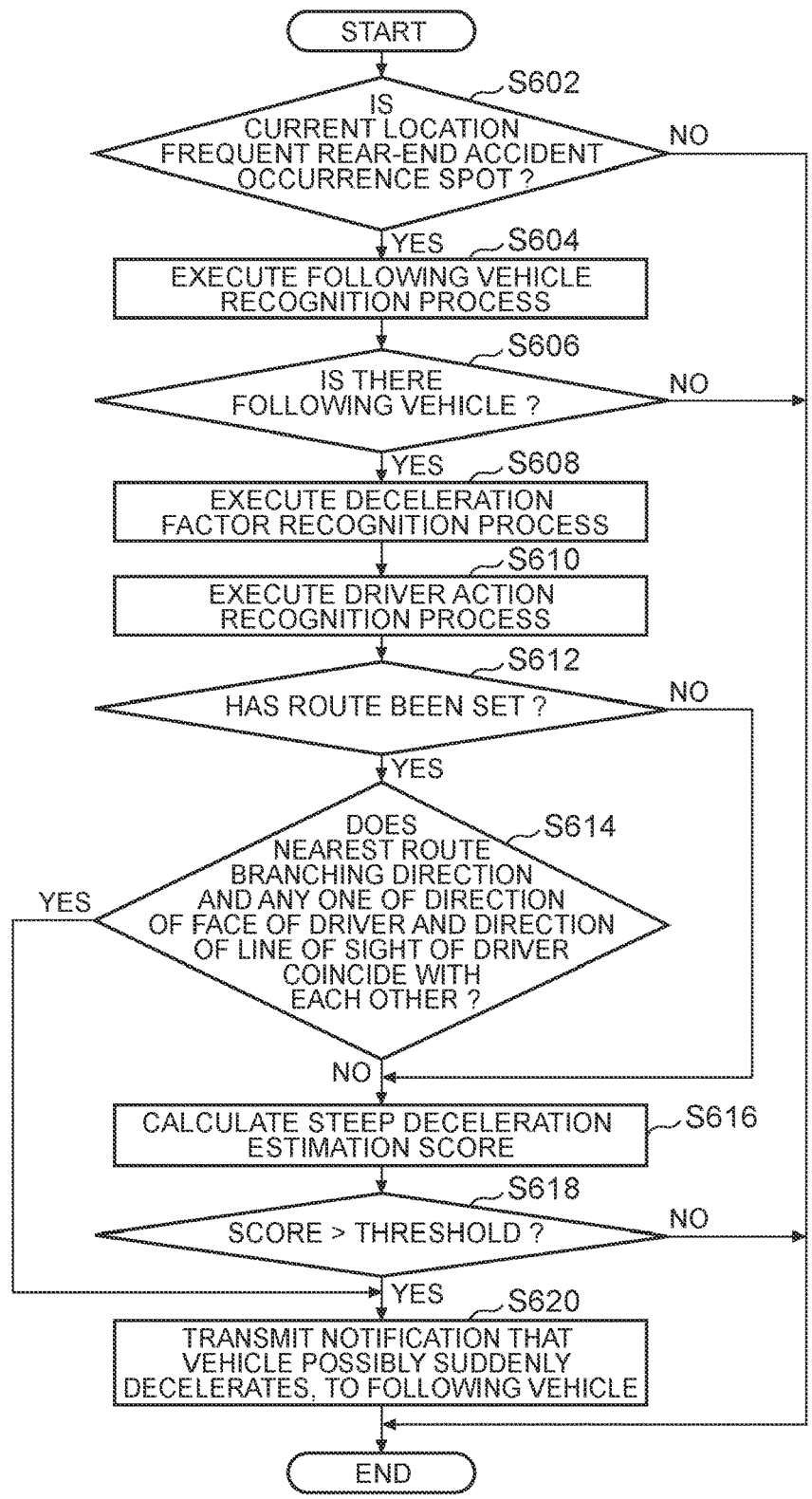
FIG. 6 is a flowchart that schematically shows an example of a sudden deceleration sign notification process by the collision avoidance device.

Subsequently, FIG. 6 is a flowchart that schematically shows an example of a sudden deceleration sign notification process that is executed by the ECU 20 of the collision avoidance device 10. The process according to this flowchart is, for example, repeatedly executed at predetermined intervals in a period from completion of an initial process of the ECU 20 after IG-ON of the vehicle 5 to IG-OFF.

In step S602, the determination unit 205 determines whether the current location of the vehicle 5 is a spot at which the frequency of occurrence of a rear-end accident is relatively high (frequent rear-end accident occurrence spot). For example, the determination unit 205 determines whether the number of rear-end accidents in a past predetermined period (for example, the last year) within a predetermined range (for example, within a range of three meters) from the current location of the vehicle 5 is larger than or equal to a predetermined number (for example, three). Specifically, the determination unit 205 consults the frequent rear-end accident occurrence spot information database 200B of the storage unit 200, and determines whether a spot corresponding to the positional information of the vehicle 5, which is input from the GPS module 35, corresponds to a frequent rear-end accident occurrence spot. When the current location of the vehicle 5 is a frequent rear-end accident occurrence spot, the determination unit 205 proceeds to step S604; otherwise, the determination unit 205 ends the current process. Thus, since a sudden deceleration sign notification is output on the assumption that the vehicle 5 is around a spot at which a rear-end accident easily occurs to some extent, it is possible to reduce an unnecessary sudden deceleration sign notification.

The frequent rear-end accident occurrence spot information database 200B contains the same content as the frequent rear-end accident occurrence spot information database 1200C of the center server 100 (storage unit 1200), and is distributed from the center server 100 to each of the vehicles 5. The frequent rear-end accident occurrence spot information database 1200C of the center server 100 may be, for example, constructed by using information that is acquired from an accident information server of the police, or the like, or may be constructed by analyzing vehicle information related to an operation status of a brake, which can be contained in probe information of the vehicle 5, gradient information that can be contained in vehicle speed information or map information (not shown), and the like, and identifying occurrence of a rear-end collision.

In step S604, the image recognition processing unit 204 executes the following vehicle recognition process based on a captured image of the rear camera 60.

In step S606, the determination unit 205 determines whether a following vehicle has been extracted from the captured image of the rear camera 60 by the image recognition processing unit 204. When a following vehicle has been extracted from the captured image of the rear camera 60 by the image recognition processing unit 204, the determination unit 205 proceeds to step S608. When no following vehicle has been extracted from the captured image of the rear camera 60, the determination unit 205 ends the current process. Thus, when there is no following vehicle, no sudden deceleration sign notification is output, so it is possible to prevent an unnecessary sudden deceleration sign notification and reduce a situation in which the processes of step S608 to step S620 (described later) are executed uselessly.

In step S608, the image recognition processing unit 204 executes the deceleration factor recognition process based on a captured image of the front camera 55.

In step S610, the image recognition processing unit 204 executes the driver action recognition process.

In step S612, the determination unit 205 determines whether a guidance route has been set by the navigation unit 203. When a guidance route has been set, the determination unit 205 proceeds to step S614. When no guidance route has been set, the determination unit 205 proceeds to step S616.

In step S614, the determination unit 205 determines whether a direction in which the guidance route branches off (for example, a right-turn direction or a left-turn direction) and an action direction of a driver's face or line of sight with respect to the front, recognized by the driver action recognition process, coincide with each other at the nearest intersection ahead of the vehicle 5. When the determination condition is satisfied, the determination unit 205 determines that the possibility of sudden deceleration of the vehicle 5 is high, and proceeds to step S620. When the determination condition is not satisfied, the determination unit 205 proceeds to step S616. This is because, when the direction in which the guidance route branches off and the action direction of the face or line of sight of the driver with respect to the front coincide with each other, the driver makes a right or left turn of the vehicle 5 in accordance with the guidance route even when the turn signal lamp is not activated and, therefore, the possibility of sudden deceleration is high.

In step S614, even when the determination condition is satisfied, the determination unit 205 may proceed to step S616 when the amount of movement of the face or line of sight with respect to the front is relatively small.

In step S616, the determination unit 205 calculates a sudden deceleration estimation score. The sudden deceleration estimation score is an index value for finding a sign of a sudden deceleration of the vehicle 5. In the present embodiment, as the value increases, it can be determined that there is a sign of a sudden deceleration, that is, the possibility of sudden deceleration becomes higher. For example, the sudden deceleration estimation score can be calculated from the result of the deceleration factor recognition process in step S608 and the result of the driver action recognition process in step S610, the frequency of occurrence of a rear-end accident near the current location of the vehicle 5, the extent to which the vehicle 5 is travelling at a speed lower than a speed in the normal traveling state (the extent of low speed), or the like. The determination unit 205 consults the score calculation table 200D of the storage unit 200, and calculates a sudden deceleration estimation score.

For example, FIG. 7 is a table that shows an example of the score calculation table 200D.

Specifically, FIG. 7 defines a score that is assigned in accordance with details (numeric value range) for each item related to the sudden deceleration estimation score. The determination unit 205 is able to calculate a sudden deceleration estimation score as the sum of the assigned scores of the items.

As shown in FIG. 7, in this example, the items related to the sudden deceleration estimation score include a face turn angle or a line of sight moving direction, which is extracted by the driver action recognition process of step S610, and the number of face turns or the number of movements of the line of sight per predetermined period of time (for example, 10 seconds). This is because, when the amount by which the driver of the vehicle 5 transversely moves the face or the line of sight is relatively large or when the frequency of the movement is relatively high, the driver of the vehicle 5 is probably driving the vehicle 5 while looking for the entrance of a destination facility, a branch point, or the like, and it is presumable that the possibility of sudden deceleration increases. Specifically, when the face turn angle or the line of sight moving angle is larger than or equal to 0° and smaller than 10° with reference to the front, no score is assigned (zero). When the face turn angle or the line of sight moving angle is larger than or equal to 10° and smaller than 30°, the score to be assigned is one. When the face turn angle or the line of sight moving angle is larger than or equal to 30°, the score to be assigned is two. When the number of face turns or the number of movements of the line of sight per predetermined period of time is smaller than or equal to one, no score is assigned (zero). When the number of face turns or the number of movements of the line of sight per predetermined period of time is larger than or equal to two and smaller than four, the score to be assigned is one. When the number of face turns or the number of movements of the line of sight per predetermined period of time is larger than or equal to four, the score to be assigned is two.

In this example, the items related to the sudden deceleration estimation score also include an extent of low speed, and a standard deviation σ of a difference between an overall average vehicle speed and an individual average vehicle speed is employed as a reference that indicates the normal traveling state of the vehicle 5. This is because when the vehicle 5 is traveling at a speed lower than a speed in the normal traveling state, the driver of the vehicle 5 is probably driving the vehicle 5 slowly while looking for the entrance of a destination facility, a branch point, or the like, and it is presumable that the possibility of sudden deceleration increases. Specifically, a score to be assigned is defined in accordance with how much the vehicle 5 is traveling at a low speed with respect to the overall average vehicle speed of a road link on which the vehicle 5 is currently traveling. When the vehicle speed of the vehicle 5 is lower than the overall average vehicle speed within the range of larger than or equal to 0σ and smaller than 1σ, no score is assigned (zero). When the vehicle speed of the vehicle 5 is lower than the overall average vehicle speed within the range of larger than or equal to 1σ and smaller than 2σ, the score to be assigned is one. When the vehicle speed of the vehicle 5 is lower than the overall average vehicle speed within the range of larger than or equal to 2σ, the score to be assigned is two.

The standard deviation σ is distributed from the center server 100 to each of the vehicles 5, and is stored as the standard deviation information 200C of the storage unit 200. Thus, the determination unit 205 is able to calculate a sudden deceleration estimation score based on the vehicle speed information that is input from the vehicle speed sensor 45 and the standard deviation information 200C.

In this example, the items related to the sudden deceleration estimation score also include the number of rear-end accidents that have occurred in a predetermined period (for example, the last year) near the current location (for example, within the range of three meters from the current location) of the vehicle 5. This is because it is presumable that a sudden deceleration easily occurs near the current location of the vehicle 5 as the number of rear-end accidents in the past increases. Specifically, when the number of rear-end accidents that have occurred in the predetermined period near the current location of the vehicle 5 is smaller than or equal to four, no score is assigned (zero). When the number of rear-end accidents that have occurred in the predetermined period near the current location of the vehicle 5 is larger than or equal to five and smaller than or equal to nine, the score to be assigned is one. When the number of rear-end accidents that have occurred in the predetermined period near the current location of the vehicle 5 is larger than or equal to 10, the score to be assigned is two. The determination unit 205 is able to acquire the number of rear-end accidents based on the frequent rear-end accident occurrence spot information database 200B.

The range of each item, corresponding to each of the values (zero, one and two) of the score to be assigned, may be constant for all the vehicles 5 or may be adjusted for each vehicle 5 so as to be adapted to the characteristics, or the like, of a driver. For example, when it is determined that the face turn angle or line of sight moving angle at the time when the driver of the vehicle 5 looks for a branch point, or the like, is relatively small as a result of machine learning, or the like, based on the history of brake operation based on probe information, the history of the results of the driver action recognition process in the past, and the like, the range of the face turn angle or line of sight moving angle, corresponding to each of the values (zero, one and two) of the score to be assigned, may be adjusted such that the score to be assigned increases even at a relatively small face turn angle or line of sight moving angle.

In this example, the items related to the sudden deceleration estimation score also include whether there is a deceleration factor around the vehicle 5, which is extracted by the deceleration factor recognition process of step S608. This is because a sudden deceleration of the vehicle 5 easily occurs when there is a deceleration factor around the vehicle 5. Specifically, when there is no deceleration factor, no score is assigned (zero). When there is a deceleration factor, the score to be assigned is two.

When there is a deceleration factor, the score to be assigned may be differentiated as a function of the number of deceleration factors.

Referring back to FIG. 6, when the calculated sudden deceleration estimation score is larger than a predetermined threshold in step S618, the determination unit 205 determines that the possibility of sudden deceleration of the vehicle 5 is high, and proceeds to step S620. When the calculated sudden deceleration estimation score is smaller than or equal to the predetermined threshold, the determination unit 205 determines that the possibility of sudden deceleration of the vehicle 5 is low, and ends the current process.

The predetermined threshold may be constant for all the vehicles 5 or may be adjusted for each vehicle 5 so as to be adapted to the characteristics, or the like, of the driver. For example, the threshold of the vehicle 5 at which it is determined that the frequency of sudden deceleration is high as a result of machine learning, or the like, based on the history of brake operation, or the like, may be set to a relatively low value. In the score calculation table shown in FIG. 7, the score to be assigned increases as a sudden deceleration of the vehicle 5 more easily occurs. Instead, the score to be assigned may decrease as a sudden deceleration of the vehicle 5 more easily occurs. At this time, in step S618, the determination unit 205 may be configured to proceed to step S620 when the score to be assigned is smaller than the predetermined threshold.

In step S620, the notification transmission unit 206 transmits a sudden deceleration sign notification to a following vehicle (another vehicle 5 that travels behind the host vehicle 5) via the vehicle-to-vehicle communication device 40, and ends the current process. Thus, it is possible to provide a notification that there is a possibility of sudden deceleration of the vehicle 5 to a driver of the following vehicle.

In this example, as described above, a sudden deceleration sign notification is output on the assumption that the vehicle 5 is around a spot at which a rear-end accident easily occurs to some extent; however, the process of step S602 may be omitted. Thus, since a sudden deceleration sign notification is also output for a sudden deceleration that occurs at a spot other than a spot at which a rear-end accident easily occurs to some extent, it is possible to further reduce a rear-end collision of a following vehicle with the vehicle 5.

In this example, the items related to the sudden deceleration estimation score include the number of rear-end accidents as shown in FIG. 7, the process of step S602 may be used as the assumption at the time of providing a sudden deceleration sign notification in the case where the determination condition of step S614 is satisfied (in the case of Yes). In this case, the process of step S602 may be transferred to between Yes in step S614 and step S620, and, when the determination condition of step S602 is satisfied (in the case of Yes), the process may proceed to S620; whereas, when the determination condition of step S602 is not satisfied (in the case of No), the process may proceed to step S616.

In this example, whether to provide a sudden deceleration sign notification may be determined only by any one of the process of step S614 and the process of step S620.

In this example, part of a face turn angle or line of sight moving direction, the number of face turns or the number of movements of the line of sight per predetermined period of time (for example, 10 seconds), an extent of low speed, the number of rear-end accidents that have occurred in a predetermined period near the current location of the vehicle 5 and whether there is a deceleration factor around the vehicle 5 may be employed as the items related to the sudden deceleration estimation score.

Next, the operation of the collision avoidance system 1, and the like, according to the present embodiment will be described with reference to FIG. 8A and FIG. 8B.

FIG. 8A and FIG. 8B are views that illustrate the operation of the collision avoidance system 1, and the like, according to the present embodiment. Specifically, FIG. 8A and FIG. 8B are plan views that schematically show an example of a situation in which a vehicle 5B is traveling behind a vehicle 5A that travels on a road 801.

The vehicles 5A, 5B of FIG. 8A and FIG. 8B are included in the plurality of vehicles 5.

As shown in FIG. 8A, in this example, the vehicle 5A is traveling near a frequent rear-end accident occurrence spot, and the driver is driving the vehicle 5A at a slightly lower speed while looking for a parking lot 802 that is a destination on a left road side of the road 801 and glancing at the left road side.

In this case, as described above, there is a high possibility that the determination condition of step S614 or step S618 of FIG. 6 is satisfied, and the notification transmission unit 206 of the vehicle 5A is transmitting a sudden deceleration sign notification 803 to the vehicle 5B traveling behind via the vehicle-to-vehicle communication device 40. In response to this, the notification reception unit 207 of the vehicle 5B receives the sudden deceleration sign notification 803 received by the vehicle-to-vehicle communication device 40, and is outputting a voice notification 804 corresponding to the sudden deceleration sign notification from the speaker 70.

Specifically, a voice notification 804 having the content that "The preceding vehicle probably makes a left turn. Be careful about a distance to the preceding vehicle." is output from the speaker 70 inside the cabin of the vehicle 5B. Thus, the driver of the vehicle 5B is allowed to recognize that the vehicle 5A possibly suddenly decelerates.

The notification transmission unit 206 of the vehicle 5A may determine that the vehicle 5A is likely to make a left turn based on, for example, the fact that the driver of the vehicle 5A is flicking the line of sight leftward or information, such as the fact that the parking lot 802 that is a destination set by the navigation unit 203 is located on the left side, and may transmit a sudden deceleration sign notification including that the vehicle 5A is likely to make a left turn, to the vehicle 5B. Thus, the notification reception unit 207 of the vehicle 5B is able to cause the voice notification 804 having the above-described content to output from the speaker 70.

As shown in FIG. 8B, the driver of the vehicle 5B extends a distance to the vehicle 5A by performing brake operation upon hearing the content of the voice notification 804 output from the speaker 70. Thus, a rear-end accident of the vehicle 5B with the vehicle 5A that suddenly decelerates through brake operation of the driver who has found the parking lot 802 is avoided.

In this way, in the present embodiment, the driver action detection unit (specifically, the indoor camera 50) detects the action of the driver of the vehicle 5, and the determination unit 205 determines whether to provide a notification about a sign of the behavior of the vehicle 5, which possibly causes a rear end collision of a following vehicle, to the driver of the following vehicle based on the detected action of the driver of the vehicle 5. The notification transmission unit 206 provides the above notification to the driver of the following vehicle based on the result determined by the determination unit 205.

Thus, the collision avoidance device 10 detects the action of the driver and, for example, when the face or line of sight of the driver of the vehicle 5 seems to be looking for something, the collision avoidance device 10 is able to find a sign of the behavior of the vehicle 5, which possibly causes a rear-end collision of a following vehicle, such as sudden braking in the case where the driver has found a place that the driver is looking for thereafter. For this reason, even in a situation in which a deceleration of the vehicle 5 is not estimated in advance, the collision avoidance device 10 is able to determine whether to provide a notification about the behavior of the vehicle 5, which possibly causes a rear-end collision of a following vehicle, to a driver of the following vehicle based on the action of the driver of the vehicle 5. Therefore, even in a situation in which a deceleration of the vehicle 5 is not estimated in advance, the collision avoidance device 10 is able to provide a notification about a sign of the behavior of the vehicle 5, which possibly causes a rear-end collision, to the driver of the following vehicle based on the determined result.

In the present embodiment, the determination unit 205 determines whether to provide a notification to a driver of a following vehicle based on whether there is an object or situation that can be a deceleration factor of the vehicle 5 around the vehicle 5.

Thus, when there is an object (for example, a stop line, a preceding vehicle, or the like) or situation (for example, a red signal, or the like) that can be a deceleration factor around the vehicle 5, the collision avoidance device 10 is able to determine that sudden braking of the vehicle 5 easily occurs. Therefore, the collision avoidance device 10 is able to find a sign of the behavior of the vehicle 5, which possibly causes a rear-end collision, based on whether there is a deceleration factor. That is, specifically, the collision avoidance device 10 is able to determine whether to provide a notification about the sign to the driver of the following vehicle based on whether there is a deceleration factor.

In the present embodiment, the determination unit 205 also determines whether to provide a notification to a driver of a following vehicle based on the frequency of occurrence of a rear-end accident near the current location of the vehicle 5.

Thus, the collision avoidance device 10 determines that the behavior of the vehicle 5, which possibly causes a rear-end collision of a following vehicle, more easily occurs as the frequency of occurrence of a rear-end accident near the current location of the vehicle 5 increases. For this reason, the collision avoidance device 10 is able to find a sign of the behavior of the vehicle 5, which possibly causes a rear-end collision, in consideration of the frequency of occurrence of a rear-end accident near the current location of the vehicle 5. That is, specifically, the collision avoidance device 10 is able to determine whether to provide a notification about a sign of the behavior of the vehicle 5, which possibly causes a rear-end collision of a following vehicle, to a driver of the following vehicle based on the frequency of occurrence of a rear-end accident near the current location of the vehicle 5.

In the present embodiment, the determination unit 205 also determines whether to provide a notification to a driver of a following vehicle based on an extent to which the vehicle 5 is traveling at a speed lower than a predetermined reference speed corresponding to a speed during normal times (the extent of low speed).

Thus, the collision avoidance device 10 is allowed to determine that there is a higher possibility that the driver is, for example, looking for a facility that is a destination or looking for the entrance of a parking lot of a large facility as the extent to which the vehicle 5 is traveling at a speed lower than the speed during normal times, and determine that sudden braking of the vehicle 5 easily occurs as a target that the driver is looking for is found. Therefore, the collision avoidance device 10 is able to find a sign of the behavior of the vehicle 5, which possibly causes a rear-end collision of a following vehicle, based on the extent to which the vehicle 5 is traveling at a speed lower than the speed during normal times. That is, specifically, the collision avoidance device 10 is able to determine whether to provide a notification about a sign of the behavior of the vehicle 5, which possibly causes a rear-end collision of a following vehicle, to a driver of the following vehicle based on the extent to which the vehicle 5 is traveling at a speed lower than the speed during normal times increases.

In the present embodiment, the determination unit 205 determines whether to provide a notification to a driver of a following vehicle based on whether the direction of the face or line of sight of the driver, detected by the driver action detection unit, and the direction in which a guidance route set by a navigation system (navigation unit 203) of the vehicle 5 branches off at the nearest intersection ahead of the vehicle 5 coincide with each other.

Thus, when the direction of the face or line of sight of the driver and the direction in which the guidance route set by the in-vehicle navigation system branches off at the intersection ahead of the vehicle 5 coincide with each other, the collision avoidance device 10 is allowed to determine that the vehicle 5 can branch off at the next intersection in accordance with the set guidance route, that is, the vehicle 5 possibly suddenly decelerates at the time of branching. Therefore, specifically, the collision avoidance device 10 is able to determine whether to provide a notification about a sign of the behavior of the vehicle 5, which possibly causes a rear-end collision, to a following vehicle.

The determination unit 205 may determine whether to provide a notification to a driver of a following vehicle based on whether the direction of the face or line of sight of the driver, detected by the driver action detection unit, and the direction in which a facility corresponding to a destination set by the navigation system (navigation unit 203) is present when viewed from the vehicle 5 that has reached around the destination coincide with each other. That is, the determination unit 205 may determine to provide a sudden deceleration sign notification to a driver of a following vehicle when the direction of the face or line of sight of the driver, detected by the driver action detection unit, and the direction in which a facility corresponding to a destination set by the navigation system (navigation unit 203) is present when viewed from the vehicle 5 that has reached around the destination coincide with each other.

Thus, when the direction of the face or line of sight of the driver and the direction in which a facility that is a destination set by the in-vehicle navigation system is present when viewed from the vehicle 5 that has reached the destination coincide with each other, the collision avoidance device 10 is allowed to determine that the driver of the vehicle 5 is driving the vehicle 5 while looking for the entrance, or the like, of the facility, that is, the vehicle 5 possibly suddenly decelerates as the driver finds the entrance, or the like. Therefore, specifically, the collision avoidance device 10 is able to determine whether to provide a notification about a sign of the behavior of the vehicle 5, which possibly causes a rear-end collision, to a following vehicle.

In the present embodiment, the determination unit 205 may assign a score in accordance with each of the frequency of movements and amount of movement of the face or line of sight of the driver, detected by the driver action detection unit, whether there is an object or situation that can be a deceleration factor of the vehicle 5 around the vehicle 5, the frequency of occurrence of a rear-end accident near the current location of the vehicle 5 and the extent to which the vehicle 5 is traveling at a speed lower than a predetermined reference speed corresponding to a speed during normal times (the extent of low speed), and may determine whether to provide a notification to a driver of a following vehicle based on the sum of the assigned scores (sudden deceleration estimation score).

Thus, the collision avoidance device 10 is allowed to determine that there is a higher possibility that the driver of the vehicle 5 is looking for an intersection for causing the vehicle 5 to branch off, a destination, or the like, as the frequency or amount of movement of the face or line of sight of the driver of the vehicle 5 increases, and, when a target that the driver is looking for has been found, sudden braking of the vehicle 5, that is, the behavior of the vehicle 5, which possibly causes a rear-end collision, easily occurs. When there is an object or situation that can be a deceleration factor around the vehicle 5, the collision avoidance device 10 is also allowed to determine that sudden braking of the vehicle 5, that is, the behavior of the vehicle 5, which possibly causes a rear-end collision, easily occurs. The collision avoidance device 10 is allowed to determine that the behavior of the vehicle 5, which possibly causes a rear-end collision of a following vehicle, more easily occurs as the frequency of occurrence of a rear-end accident near the current location of the vehicle 5 increases. The collision avoidance device 10 is also allowed to determine that sudden braking of the vehicle 5, that is, the behavior of the vehicle 5, which possibly causes a rear-end collision, more easily occurs as the extent to which the vehicle 5 is traveling at a speed lower than a speed during normal times increases, for example, when there is a high possibility that the driver is looking for a facility that is a destination or looking for the entrance of a parking lot of a large facility and, when a target that the driver is looking for has been found, determine that sudden braking of the vehicle 5, that is, the behavior of the vehicle 5, which possibly causes a rear-end collision, easily occurs. Therefore, specifically, for example, by assigning a score to each item such that it is determined that the behavior of the vehicle 5, which possibly causes a rear-end collision, more easily occurs as the score increases, the collision avoidance device 10 is allowed to determine whether to provide a notification about a sign of the behavior of the vehicle 5, which possibly causes a rear-end collision of a following vehicle, to a driver of the following vehicle based on whether the sum of the assigned scores is larger than or equal to a predetermined threshold.

In the present embodiment, the predetermined reference speed corresponding to the normal traveling state of the vehicle 5 is defined in advance based on a standard deviation of a difference between a reference vehicle speed and a vehicle speed of the vehicle 5 for each of a plurality of roads through which the vehicle 5 has passed.

Thus, specifically, the collision avoidance device 10 is allowed to utilize a standard deviation of a difference between a reference vehicle speed (for example, a legal vehicle speed or an average vehicle speed of a plurality of passage vehicles) and a vehicle speed of the vehicle 5 for each road as a reference corresponding to normal times (normal traveling state) for defining the extent to which the vehicle 5 is traveling at a speed lower than a speed during normal times.

In the present embodiment, when a following vehicle has been detected by the following vehicle detection unit (specifically, the rear camera 60), the determination unit 205 determines to provide the above-described notification to a driver of the following vehicle.

Thus, since the collision avoidance device 10 provides a notification to a driver of a following vehicle only when there is a following vehicle, the collision avoidance device 10 is able to reduce an unnecessary notification.

In the present embodiment, the driver action detection unit includes a camera (indoor camera 50) provided in the cabin of the vehicle 5, or a line-of-sight sensor.

Thus, specifically, the collision avoidance device 10 is able to detect the action of the driver with the use of the camera, the line-of-sight sensor, or the like.

In the present embodiment, the notification transmission unit 206 provides a notification to a driver of a following vehicle by vehicle-to-vehicle communication.

Thus, the collision avoidance device 10 is able to transmit the content of a notification to a following vehicle by vehicle-to-vehicle communication and provide the notification to a driver of the following vehicle via a notification unit that is mounted on the following vehicle, for example, an audio output device, such as the speaker 70, or a display device, such as the display 65.

The notification transmission unit 206 may provide a notification to a driver of a following vehicle with the use of a lamp device provided at the rear of the vehicle 5 (rear lamp device 75), including hazard flashers and turn signal lamps.

Specifically, the notification transmission unit 206 may provide a notification about the possibility of sudden braking of the vehicle 5 to a driver of a following vehicle by, for example, blinking the hazard flashers relatively quickly. For example, as in the case of FIG. 8A, when the vehicle 5A is likely to branch off, such as a right turn or a left turn, and, because of this, it is determined that the vehicle 5A possibly suddenly decelerates, the notification transmission unit 206 may also provide a notification that there is a possibility of right turn or left turn to a driver of a following vehicle by blinking the corresponding turn signal lamp at the rear of the vehicle 5A.

Thus, specifically, the collision avoidance device 10 is able to provide a notification about a sign of the behavior of the vehicle 5, which possibly causes a rear-end collision, to a driver of a following vehicle by, for example, blinking the hazard flashers or blinking the turn signal lamp of the direction in which the vehicle 5 is predicted to branch off.

In the present embodiment, a notification to a driver of a following vehicle, which is provided by the notification transmission unit 206, may have a content that the vehicle 5 possibly suddenly decelerates.

Thus, specifically, the collision avoidance device 10 is able to provide a notification that the vehicle 5 possibly suddenly decelerates, to a driver of a following vehicle.

The embodiment of the disclosure is described in detail above; however, the disclosure is not limited to the specific embodiment. Various modifications or changes are applicable within the scope of the disclosure recited in the appended claims.

What is claimed is:

1. A collision avoidance device for a vehicle, the collision avoidance device comprising:
   a driver action detection device configured to detect an action of a driver of the vehicle; and
   an electronic control unit configured to determine whether to provide a notification to a driver of a following vehicle based on the action of the driver of the vehicle, detected by the driver action detection device, the notification being a notification about a sign of a behavior of the vehicle, which possibly causes a rear-end collision of the following vehicle,
   the electronic control unit being configured to provide the notification to the driver of the following vehicle based on a result determined by the electronic control unit,
   wherein the electronic control unit is configured to determine whether to provide the notification to the driver of the following vehicle based on an extent to which the vehicle is traveling at a speed lower than a predetermined reference speed, and
   wherein the predetermined reference speed is defined in advance based on a standard deviation of a difference between a reference vehicle speed and a vehicle speed of the vehicle for each of a plurality of roads through which the vehicle has passed.

2. The collision avoidance device according to claim 1, wherein
   the electronic control unit is configured to determine whether to provide the notification to the driver of the following vehicle based on whether there is a deceleration factor of the vehicle.

3. The collision avoidance device according to claim 1, wherein
   the electronic control unit is configured to determine whether to provide the notification to the driver of the following vehicle based on a frequency of occurrence of a rear-end accident near a current location of the vehicle.

4. The collision avoidance device according to claim 1, wherein:
the electronic control unit is configured to determine whether to provide the notification to the driver of the following vehicle based on whether a first predetermined direction detected by the driver action detection device and a second predetermined direction coincide with each other;
the first predetermined direction is any one of a direction of a face of the driver and a direction of a line of sight of the driver; and
the second predetermined direction is any one of a direction in which a route set by a navigation system of the vehicle branches off at a nearest intersection ahead of the vehicle and a direction in which a facility is present when viewed from the vehicle that has reached around a destination, the destination is set by the navigation system, the facility corresponds to the destination.

5. The collision avoidance device according to claim 4, wherein:
the electronic control unit is configured to assign a score in accordance with each of the following i) to v),
i) a frequency of movement of a detected object, the frequency of movement being detected by the driver action detection device,
ii) an amount of movement of the detected object, the amount of movement being detected by the driver action detection device,
iii) whether there is a deceleration factor of the vehicle,
iv) a frequency of occurrence of a rear-end accident near a current location of the vehicle, and
v) an extent to which the vehicle is traveling at a speed lower than a predetermined reference speed;
the electronic control unit is configured to determine whether to provide the notification to the driver of the following vehicle based on a sum of the scores; and
the detected object is any one of the face of the driver and the line of sight of the driver.

6. The collision avoidance device according to claim 1, further comprising
a following vehicle detection device configured to detect the following vehicle, wherein
the electronic control unit being configured to, when the following vehicle has been detected by the following vehicle detection device, determine to provide the notification to the driver of the following vehicle.

7. The collision avoidance device according to claim 1, wherein
the driver action detection device includes at least one of a camera provided in a cabin of the vehicle and a line-of-sight sensor.

8. The collision avoidance device according to claim 1, wherein
the electronic control unit is configured to provide the notification to the driver of the following vehicle by vehicle-to-vehicle communication.

9. The collision avoidance device according to claim 1, wherein:
the electronic control unit is configured to provide the notification to the driver of the following vehicle with the use of a lamp device provided at a rear of the vehicle; and the lamp device includes at least one of a hazard flasher and a turn signal lamp.

10. The collision avoidance device according to claim 1, wherein
the notification has a content that the vehicle possibly suddenly decelerates.

11. A collision avoidance method that is executed by a collision avoidance device,
the collision avoidance device including a driver action detection device and an electronic control unit,
the collision avoidance method comprising:
a driver action detection step of detecting, by the driver action detection device, an action of a driver of a vehicle;
a determination step of determining, by the electronic control unit, whether to provide a notification about a sign of a behavior of the vehicle, which possibly causes a rear-end collision of a following vehicle, to a driver of the following vehicle based on the action of the driver of the vehicle, detected in the driver action detection step; and
a notification step of providing, by the electronic control unit, the notification to the driver of the following vehicle based on a result determined in the determination step,
wherein the electronic control unit is configured to determine whether to provide the notification to the driver of the following vehicle based on an extent to which the vehicle is traveling at a speed lower than a predetermined reference speed, and
wherein the predetermined reference speed is defined in advance based on a standard deviation of a difference between a reference vehicle speed and a vehicle speed of the vehicle for each of a plurality of roads through which the vehicle has passed.

12. A non-transitory storage medium storing a program, wherein
the program being executed by a computer mounted on a vehicle to implement a determination step and a notification step,
the determination step being a step of determining whether to provide a notification about a sign of a behavior of the vehicle, which possibly causes a rear-end collision of a following vehicle, to a driver of the following vehicle based on the action of the driver of the vehicle, detected by a driver action detection device mounted on the vehicle, and
the notification step being a step of providing the notification to the driver of the following vehicle based on a result determined in the determination step,
wherein the electronic control unit is configured to determine whether to provide the notification to the driver of the following vehicle based on an extent to which the vehicle is traveling at a speed lower than a predetermined reference speed, and
wherein the predetermined reference speed is defined in advance based on a standard deviation of a difference between a reference vehicle speed and a vehicle speed of the vehicle for each of a plurality of roads through which the vehicle has passed.

* * * * *